United States Patent
Tomaru et al.

(10) Patent No.: US 6,896,824 B2
(45) Date of Patent: May 24, 2005

(54) HEAT-SOFTENING HEAT-RADIATION SHEET

(75) Inventors: Kazuhiko Tomaru, Annaka (JP); Tsutomu Yoneyama, Annaka (JP); Ryuichi Handa, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 590 days.

(21) Appl. No.: 09/973,924

(22) Filed: Oct. 11, 2001

(65) Prior Publication Data

US 2002/0066883 A1 Jun. 6, 2002

(30) Foreign Application Priority Data

Oct. 12, 2000 (JP) ........................ 2000-312481

(51) Int. Cl.$^7$ .............................. H01B 1/02; C09K 5/00
(52) U.S. Cl. ............................ 252/73; 252/71; 252/74; 252/503; 252/506; 252/508; 252/511; 252/512; 252/513; 252/514; 252/515; 338/22 R
(58) Field of Search ................................ 252/502, 503, 252/506, 508, 512, 513, 514, 515, 511; 523/137; 524/420; 338/22 R

(56) References Cited

U.S. PATENT DOCUMENTS 4,545,926 A * 10/1985 Fouts, Jr. et al. ............ 252/511
4,983,944 A * 1/1991 Uchida et al. ............ 338/22 R
6,023,403 A * 2/2000 McGuire et al. ............ 361/106

FOREIGN PATENT DOCUMENTS

EP 0 882 574 12/1998

OTHER PUBLICATIONS

Derwent Publications. AN 1999–101208. JP 10–330575. Dec. 15, 1998.
Derwent Publications. AN 1993–232497. JP 05–156100. Jun. 22, 1993.

* cited by examiner

Primary Examiner—Yogendra N. Gupta
Assistant Examiner—D. G. Hamlin
(74) Attorney, Agent, or Firm—Oblon, Spivak, McClelland, Maier & Neustadt, P.C.

(57) ABSTRACT

A heat-softening heat-radiation sheet including a polyolefin-based heat-conductive composition which comprises a polyolefin and a heat-conductive filler, has a softening point of 40° C. or above, has a thermal conductivity of 1.0 W/mK or higher, has a viscosity at 80° C. of from $1\times10^2$ to $1\times10^5$ Pa·s and has a plasticity at 25° C. in the range of from 100 to 700. This heat-radiation sheet which is in the form of a solid sheet at room temperature, can readily be attached to or detached from electronic components and a heat sink, is capable of softening by the heat generated during operation of electronic components, to have the interfacial contact thermal resistance at a negligible level, and has a superior heat-radiation performance.

20 Claims, 1 Drawing Sheet

HEAT-SOFTENING HEAT-RADIATION SHEET

BACKGROUND OF THE INVENTION

1. Field of the Invention

This invention relates to a heat-radiation sheet used to cool heat-generating electronic components, and more particularly to a heat-softening heat-radiation sheet whose quality is capable of changing reversibly from a solid into a paste or liquid with an elevation of temperature of electronic components.

2. Description of the Prior Art

In recent years, CPUs and LSIs such as driver ICs and memories, used in personal computers, digital video disks and cell phones generate a larger amount of heat as they have become required a larger power consumption with an improvement in the degree of integration and an achievement of high-speed operation. This may cause mis-operation of electronic apparatus and equipment or break of electronic components, and hence how to dissipate or radiate their heat has greatly come into question.

In electronic apparatus and equipment and so forth, in order to keep temperatures of electronic components from rising during their use, a heat sink is conventionally used which makes use of a metal sheet having a high thermal conductivity, made of brass or the like. This heat sink conducts the heat generated by the electronic components, and radiates the heat from the surface by means of a difference in temperature from that of the air.

In order to well efficiently transmit the heat generated by the electronic components, the heat sink must be kept in close contact with electronic components. However, because of differences in height of electronic components and common differences ascribable to the manner of assemblage, a heat-conductive sheet having a flexibility or a heat-conductive grease is inserted between the electronic components and the heat sink so that the conduction of heat from the electronic components to the heat sink is materialized via such a heat-conductive sheet or heat-conductive grease. As the heat-conductive sheet, a heat-conducting sheet (e.g., a heat-conductive silicone rubber sheet) formed of heat-conductive silicone rubber is used. As the heat-conductive grease, a heat-conductive silicone grease is used.

However, in heat-conductive silicone rubber sheets conventionally used, contact thermal resistance exists at the interface between the sheet and the electronic components, and hence there is a limit to the performance of heat conduction. This is a great problem for the cooling of CPUs which generate a large amount of heat and are driven at a high frequency. Accordingly, it has been sought to lessen the interfacial contact thermal resistance.

Meanwhile, the heat-conductive silicone grease has a quality close to a liquid, and hence has the interfacial contact thermal resistance at an almost negligible level and has a good performance of heat conduction. It, however, has problems that it requires a device exclusively used therefor, such as a dispenser, and involves a poor operability when collected.

SUMMARY OF THE INVENTION

The present inventors have made extensive studies to solve the above problems. Accordingly, an object of the present invention is to provide a heat-radiation sheet which is in the form of a solid sheet at room temperature, can readily be attached to or detached from electronic components and a heat sink, is capable of softening by the heat generated during operation of electronic components, to have the interfacial contact thermal resistance at a negligible level, and has a superior heat-radiation performance.

Thus, the present invention provides a heat-softening heat-radiation sheet comprising a polyolefin-based heat-conductive composition which comprises a polyolefin and a heat-conductive filler, has a softening point of 40° C. or above, has a thermal conductivity of 1.0 W/mK or higher, has a viscosity at 80° C. of from $1 \times 10^2$ to $1 \times 10^5$ Pa·s and has a plasticity at 25° C. in the range of from 100 to 700.

DESCRIPTION OF THE PREFERRED EMBODIMENTS

Figure 1:
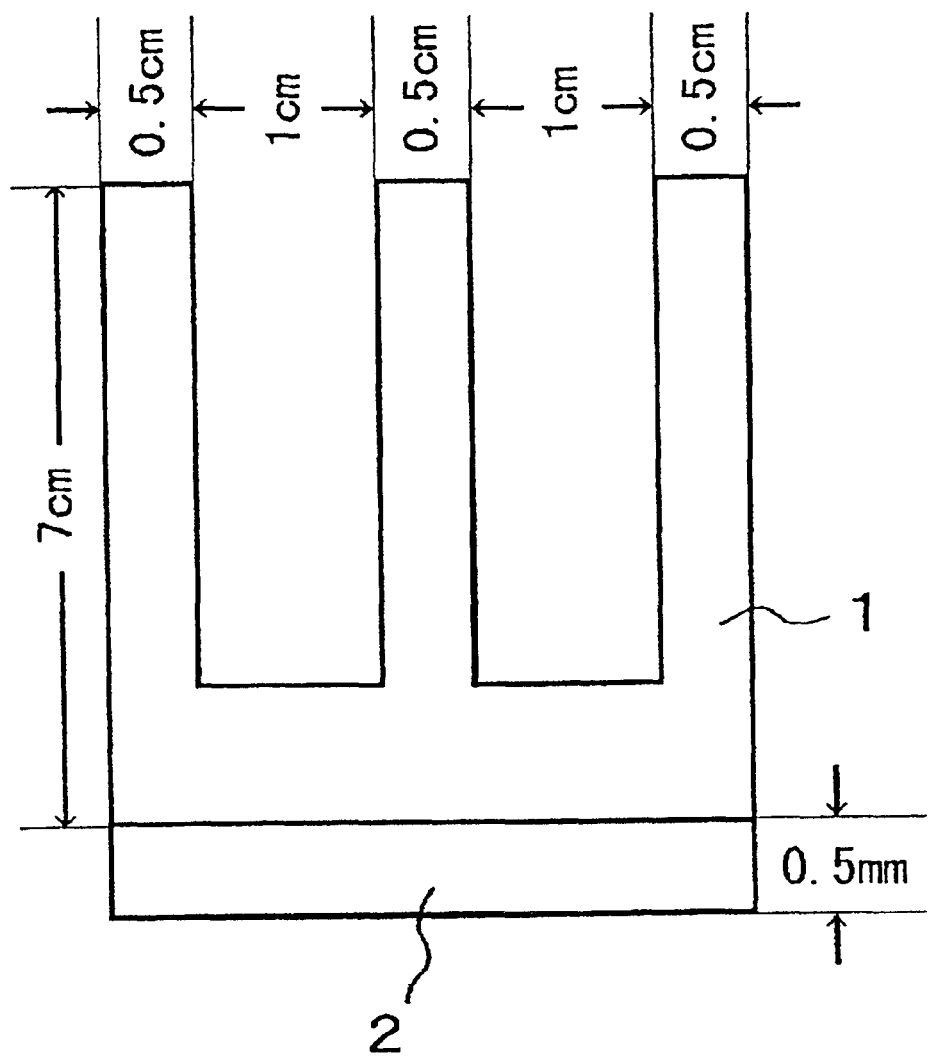
FIG. 1 is an elevation showing how the heat-radiation sheet is attached to a heat sink to measure tack.

The heat-softening heat-radiation sheet of the present invention comprises a polyolefin-based heat-conductive composition which comprises a polyolefin and a heat-conductive filler.

Polyolefin

On the polyolefin used in the present invention, there are no particular limitations as long as the composition according to the present invention has a softening point of 40° C. or above. As to the upper limit of the softening point, it may preferably be 120° C. or below, and particularly preferably 100° C. or below. Stated specifically, it may be exemplified by polyolefins containing an α-olefin-based polymer, having a softening point of from 40° C. or above. These may be used alone or in the form of a mixture of two or more types. In particular, preferred are those containing an α-olefin polymer, an ethylene/α-olefin copolymer and an ethylene/α-olefin/non-conjugated polyene random copolymer.

Among polyolefins, the α-olefin plays a role as a heat-softening component of the heat-softening heat-radiation sheet, and is represented by the general formula (1):

wherein n=16 to 50, at which the α-olefin polymer is solid or waxy and has a melting point ranging from 40° C. to 100° C. If n is less than 16, the α-olefin polymer may have a problem that it is liquid at room temperature and hence may bleed from the heat-radiation sheet. If n is more than 50, the α-olefin polymer does not melt at the operation temperature in the range of 40° C. to 100° C. (typically, e.g., 100° C.) of electronic components, making the heat-radiation sheet have poor heat-softening properties.

As the α-olefin, the use of a mixture of two or more types of α-olefins having a different number of carbon atoms can make the mixture have a melt temperature in a wide range (i.e., can make the mixture have a softening temperature in a wide range), compared with the case in which a single α-olefin is used. Hence, the mixture can also gently harden or soften upon any abrupt changes in temperature, so that stable heat-radiation properties can be obtained. As a specific example, the α-olefin polymer may include DIAREN (trade name; available from Mitsubishi Chemical Corporation).

The ethylene/α-olefin copolymer endows the sheet with flexibility and tack. It is represented by the following general formula (2):

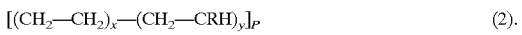

wherein R is an alkyl group represented by —$C_nH_{2n+1}$ where n is an integer, preferably 1 to 10; X, and Y are integers, and preferably X is an integer of 1 to 100, and Y is an integer of 5 to 100, P is an integer of 5 to 500.

The ethylene/α-olefin copolymer may preferably be a copolymer which is liquid at room temperature, and may preferably be a copolymer having a viscosity at 25° C. in the range of from 200 to 1,000,000 cSt. If it has a viscosity lower than 200 cSt, the heat-radiation sheet may have an insufficient green strength to make handling properties poor. If it has a viscosity higher than 1,000,000 cSt, the heat-radiation sheet may have a poor sheet workability. It may preferably have a viscosity of from 300 to 300,000 cSt. A polymer having a single viscosity may also be used; however, the use of a mixture of two or more of polymers having different viscosities is advantageous because a heat-radiation sheet having well balanced flexibility and tack can be obtained.

As a specific example of the ethylene/α-olefin copolymer, it may include LOOCANT (trade name; available from Mitsui Chemicals Inc.).

The ethylene/α-olefin/non-conjugated polyene random copolymer retains the strength of the sheet. This copolymer is an ethylene/(α-olefin/non-conjugated polyene random copolymer rubber in which the non-conjugated polyene contained therein is comprised of at least one vinyl group-terminated norbornene compound selected from the compounds represented by the following general formula (3):

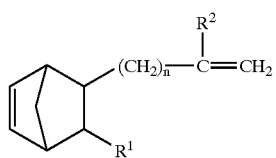

(3)

wherein n is an integer of 0 to 10, $R^1$ is a hydrogen atom or an alkyl group having 1 to 10 carbon atoms, and $R^2$ is a hydrogen atom or an alkyl group having 1 to 5 carbon atoms; or the general formula (4):

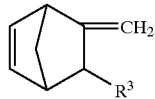

(4)

wherein $R^3$ is a hydrogen atom or an alkyl group having 1 to 10 carbon atoms.

Of these, 5-vinyl-norbornene and 5-methylene-norbornene are preferred.

The ethylene/α-olefin/non-conjugated polyene random copolymer is solid at room temperature, and shows flowability as having a Mooney viscosity (JIS K 6395) in the range of from 5 to 50 at 100° C. If it has a Mooney viscosity lower than 5, the heat-radiation sheet may have an insufficient green strength to make handling properties poor. If it has a Mooney viscosity higher than 50, the heat-radiation sheet is not improved in green strength to have a poor sheet workability and at the same time have a low flexibility. It may more preferably have a Mooney viscosity in the range of from 5 to 25. Also, ethylene content is a chief factor that determines the crystallinity in the polymer, and has an influence/on the green strength. An ethylene content which is less than 63% may result in a low green strength, and an ethylene content which is more than 63% may bring about an abrupt increase in green strength. In the present invention, a single polymer having the same ethylene content may be used. More preferably, the use of two or more different types of polymers having different ethylene contents is advantageous because the workability and flexibility of the sheet can be balanced.

As a specific example of the ethylene/α-olefin/non-conjugated polyene random copolymer, it may include MITSUI EPT (trade name; available from Mitsui Chemicals Inc.).

Mixing proportion of these polyolefins may be selected within the range which such that it gives the softening point of 40° C. or above, the viscosity at 80° C. of $1 \times 10^2$ to $1 \times 10^5$ Pa·s and the plasticity at 25° C. in the range of from 100 to 700.

The polyolefin-based heat-conductive composition of the present invention softens at 40° C. or above. It may be prepared such that it softens only once and thereafter hardens or cures. In order to prepare such a composition, to the composition can be added an organohydrogenpolysiloxane and a catalyst, or an organic peroxide. The composition thus prepared may be softened and melted by the heat applied from the electronic components and thereafter the ethylene/α-olefin/non-conjugated polyene random copolymer may be cross-linked.

Heat-Conductive Filler

As the heat-conductive filler, usable are one or more types of, e.g., powders of metals such as iron, aluminum, nickel, silver and gold; powders of inorganic oxides such as silicon oxide, aluminum oxide, zinc oxide, iron oxide and magnesium oxide; or powders of inorganic nitride such as aluminum nitride and boron nitride. The filler must be compounded in an amount that provides the thermal conductivity of at least 1.0 W/mK, which may vary depending on the type of the heat-conductive filler.

Other Optional Components

As optional components, additives or fillers usually compounded in synthetic rubbers may further optionally be used.

Stated specifically, a silicone oil or a fluorine-modified silicone surface-active agent may be added as a release agent, carbon black or titanium dioxide as a colorant, a halogen compound as a flame retardant, and a carbon functional silane as a workability improver.

Physical Properties

The polyolefin-based heat-conductive composition of the present invention must have a thermal conductivity of 1.0 W/mK or higher, and preferably from 2.0 to 20.0 W/mK, have a viscosity at 80° C. of from $1 \times 10^2$ to $1 \times 10^5$ Pa·s, and preferably from $5 \times 10^2$ to $5 \times 10^4$ Pa·s, and have a plasticity at 25° C. according to JIS K 6200 in the range of from 100 to 700, and preferably from 200 to 600.

If it has a thermal conductivity lower than 1.0 W/mK, the the heat conduction across the electronic components and the heat sink may be too low to obtain sufficient heat-radiation performance.

If it has a viscosity at 80° C. which is lower than $1 \times 10^2$ Pa·s, the sheet of the present invention may melt to tend to flow out through the interface between the electronic components and the heat sink. If it has viscosity higher than $1 \times 10^5$ Pa·s, the sheet may provide so high an interfacial contact thermal resistance that the heat conduction across the electronic components and the heat sink may be too low to obtain sufficient heat-radiation performance.

If it also has a plasticity at 25° C. which is lower than 100, the sheet may have poor handling properties when attached to the electronic components. If it has a plasticity higher than 700, the sheet may have poor workability and have poor handling properties when attached to the electronic components.

The polyolefin-based heat-conductive composition described above can be obtained by uniformly mixing the above components by means of a rubber kneading machine such as a twin-screw roll mill, a Banbury mixer, a dough mixer (a kneader), a gate mixer or a planetary mixer.

The heat-softening heat-radiation sheet of the present invention can be obtained by forming the polyolefin-based heat-conductive composition thus obtained, into a sheet by e.g., extrusion, calendering, roll shaping or press molding.

EXAMPLES

Description of Materials:

In the following Examples, materials shown below were used.

1) As the ethylene/α-olefin/non-conjugated polyene random copolymer, products having trade names as shown in Table 1 which are available from Mitsui Chemicals Inc.

TABLE 1

| Physical properties | EPT-PX055 | EPT-4010 | EPT-4021 | EPT-X3012P | EPT-8075E |
|---|---|---|---|---|---|
| Mooney viscosity (100° C.) | 8 | 8 | 24 | 15 | 100 |
| Ethylene content (%) | 58 | 65 | 67 | 70 | 65 |

2) Ethylene/α-olefin copolymer: LOOCANT HC40 (350 cSt), HC3000X (25,000 cSt), HC10 (140 cSt). Trade names of products available from Mitsui Chemicals Inc. Numerical values in parentheses indicate viscosities at 25° C.

3) α-Olefin polymer: DIAREN 30 (30 to 40), DIAREN 208 (17 to 25), DIAREN 18 (15). Trade names of products available from Mitsubishi Chemical Corporation. Numerical values in parentheses indicate the values of n in the general formula (1).

4) Silver powder: Ag-E-100 (trade name; available from Fukuda Kinzokuhakufun Kogyo K.K.).

5) Alumina powder: AS30 (trade name: available from Showa Denko K.K.).

6) Silica powder: CRYSTALITE VXS (trade name; available from Tatsumori).

7) Boron nitride powder: KBN-(h)-10 (trade name; available from Shin-Etsu Chemical Co., Ltd.).

8) Carbon functional silane: KBM3103 (trade name; available from Shin-Etsu Chemical Co., Ltd.).

EXAMPLES 1 TO 11 & COMPARATIVE EXAMPLE 1

In the respective Examples and Comparative Example, materials formulated as shown in Tables 2 to 4 were introduced into a planetary mixer, and were mixed at 100° C. for 2 hours with stirring. Next, the mixture obtained was deaerated and mixed at room temperature by means of a twin-roll mill. The compound obtained was extruded by means of an extruder in a width of 100 mm and a thickness of 0.5 mm to make it into a sheet. Pieces of sheet with given shapes were stamped out from the heat softening heat-radiation sheet thus obtained.

Their plasticity, thermal conductivity, thermal resistance, viscosity and softening point were measured by the methods shown below, and evaluation was made according to criteria of "⊚" (excellent), "○" (good), "Δ" (a little good) and "X" (poor).

Measuring Methods

1) Measurement of plasticity: Measured by the plasticity test prescribed in JIS K-6249.
2) Measurement of thermal conductivity: Measured with a thermal conductivity measuring instrument QTM-500 (trade name; manufactured by Kyoto Denki K.K.).
3) Measurement of thermal resistance: A sample with a thickness of 0.5 mm stamped into the shape of a transistor Type TO-3 is put between a transistor 2SD923 (trade name; manufactured by Fuji Electric Co., Ltd.) and a heat sink FBA-150-PS (trade name; manufactured by K.K. OS), and a compression load of 300 gf/cm$^2$ is applied. The heat sink is put in a temperature-controlled water bath so as to be kept warm at 60° C.

Next, an electric power is supplied with 10 V and 3A to the transistor, and the temperatures of the transistor and the heat sink are measured with thermocouples built in the transistor and heat sink respectively. The thermal resistance $R_S$ (°C/W) of the sample is calculated from the following equation:

$$R_s = (T_1 - T_2)/30$$

wherein $T_1$ and $T_2$ are temperatures of the transitor and the heat sink, respectively.

4) Measurement of viscosity: Measured with an ARES viscoelasticity system (manufactured by Rheometric Scientific F,E, Ltd.)
5) Measurement of softening point: Measured by the Vicat softening temperature test method prescribed in JIS K7206.

Evaluation

Sheet Workability:

Evaluated by extrusion performance.

Flexibility:

Evaluated by how the sheet cracks when it is bent at an angle of 90°.

Tack:

A heat-radiation sheet 2 is so disposed as to cover the bottom surface of a heat sink 1 having the shape and dimensions as shown in FIG. 1, which is then left for 5 minutes in the air with the heat-radiation sheet 2 down. Evaluation is made by whether or not the heat-radiation sheet has peeled or come off. Incidentally, in FIG. 1 the heat-radiation sheet is drawn with its thickness enlarged intentionally.

Handling Properties:

The sheet is manually attached to the heat sink to evaluate fittingness.

The results of the above measurement and evaluation are shown in Tables 2 to 4.

COMPARATIVE EXAMPLES 2 TO 5

For comparison, the thermal resistance and handling properties of commercially available silicone rubber heat-radiation sheets (thickness: 0.5 mm; Comparative Examples 2 to 4) and grease (Comparative Example 5) were measured and examined in the same manner as in Examples to make evaluation. The results are shown in Table 5.

TABLE 2

(Amount: parts by weight)

| Materials | Example 1 | Example 2 | Example 3 | Example 4 |
|---|---|---|---|---|
| EPT-PX055 | 20 | 0 | 0 | 0 |
| EPT-4010 | 0 | 20 | 0 | 0 |
| EPT-4021 | 0 | 0 | 20 | 0 |
| EPT-X3012P | 0 | 0 | 0 | 20 |
| LOOCANTHC3000X | 30 | 30 | 30 | 30 |
| DIAREN30 | 20 | 20 | 20 | 20 |
| DIAREN208 | 30 | 30 | 30 | 30 |
| KBM3103 | 3 | 6 | 2 | 4 |
| Ag-E-100 | 800 | 0 | 0 | 0 |
| AS30 | 0 | 1200 | 0 | 0 |
| CRYSTALITEVXS | 0 | 0 | 350 | 0 |
| KBN(h)-10 | 0 | 0 | 0 | 200 |
| Physical properties: | | | | |
| Plasticity/25° C. | 340 | 450 | 290 | 500 |
| Thermal conductivity (W/mK) | 2.0 | 3.0 | 1.0 | 2.7 |
| Thermal resistance/60° C. (° C./W) | 0.07 | 0.05 | 0.12 | 0.06 |
| Viscosity/80° C. (Pa·s) | $2 \times 10^4$ | $3 \times 10^3$ | $6 \times 10^3$ | $6 \times 10^3$ |
| Softening point (° C.) | 40 to 80 | 40 to 80 | 40 to 80 | 40 to 80 |
| Sheet workability | ○ | ○ | ○ | Δ |
| Flexibility | Δ | Δ | ○ | ○ |
| Tack | Δ | Δ | Δ | Δ |
| Handling properties | ○ | ○ | ○ | ○ |

TABLE 3

(Amount: parts by weight)

| Materials | Example 1 | Example 2 | Example 3 | Comparative Example 1 |
|---|---|---|---|---|
| EPT-8075E | 20 | 0 | 0 | 0 |
| EPT-4021 | 0 | 20 | 20 | 20 |
| LOOCANTHC10 | 0 | 30 | 0 | 0 |
| LOOCANTHC3000X | 30 | 0 | 30 | 30 |
| DIAREN18 | 0 | 0 | 0 | 50 |
| DIAREN30 | 20 | 20 | 0 | 0 |
| DIAREN208 | 30 | 30 | 50 | 0 |
| KBM3103 | 6 | 6 | 6 | 6 |
| AS30 | 1200 | 1200 | 1200 | 1200 |
| KBM3103 | 6 | 6 | 6 | 6 |
| Physical properties: | | | | |
| Plasticity/25° C. | 600 | 430 | 270 | 180 |
| Thermal conductivity (W/mK) | 3.0 | 3.0 | 3.0 | 3.0 |
| Thermal resistance/60° C. (° C./W) | 0.08 | 0.04 | 0.05 | 0.04 |
| Viscosity/80° C. (Pa·s) | $6 \times 10^3$ | $4 \times 10^3$ | $2 \times 10^3$ | $6 \times 10^2$ |
| Softening point (° C.) | 40 to 80 | 40 to 80 | 40 | 17 |
| Sheet workability | Δ | Δ | ○ | Δ |
| Flexibility | Δ | ○ | ○ | Δ |
| Tack | Δ | Δ | Δ | Δ |
| Handling properties | Δ | Δ | Δ | X |

TABLE 4

(Amount: parts by weight)

| Materials | Example 8 | Example 9 | Example 10 | Example 11 |
|---|---|---|---|---|
| EPT-4010 | 10 | 10 | 10 | 10 |
| EPT-X055 | 10 | 10 | 10 | 10 |
| LOOCANTHC40 | 0 | 10 | 5 | 0 |
| LOOCANTHC3000X | 30 | 20 | 25 | 30 |
| DIAREN30 | 20 | 20 | 20 | 50 |
| DIAREN208 | 30 | 30 | 30 | 0 |
| KBM3103 | 6 | 6 | 6 | 6 |
| AS30 | 1200 | 1200 | 1200 | 1200 |
| Physical properties: | | | | |
| Plasticity/25° C. | 340 | 300 | 310 | 450 |
| Thermal conductivity (W/mK) | 3.0 | 3.0 | 3.0 | 3.0 |
| Thermal resistance/60° C. (° C./W) | 0.05 | 0.02 | 0.02 | 0.05 |
| Viscosity/80° C. (Pa·s) | $2 \times 10^4$ | $1.5 \times 10^3$ | $1.8 \times 10^3$ | $7 \times 10^3$ |
| Softening point (° C.) | 40 to 80 | 40 to 80 | 40 to 80 | 80 |
| Sheet workability | ○ | ⊙ | ⊙ | Δ |
| Flexibility | ○ | ○ | ⊙ | ○ |
| Tack | ○ | ○ | ⊙ | Δ |
| Handling properties | ○ | ○ | ⊙ | Δ |

TABLE 5

| | Comparative Example 2 | Comparative Example 3 | Comparative Example 4 | Comparative Example 5 |
|---|---|---|---|---|
| Thermal conductivity (W/mK) | 2.0 | 3.0 | 4.0 | 2.7 |
| Thermal resistance/60° C. (° C./W) | 0.58 | 0.47 | 0.27 | 0.52 |
| Handling properties | Δ | Δ | ○ | X |

In handling properties, "⊙" (good), "Δ" (a little good) and "X" (poor).

As can be seen from Examples and Comparative Examples, the heat-softening heat-radiation sheets of Examples according to the present invention are proved to have a superior heat-radiation effect and also are effective for heat-radiation of electronic components, because their contact thermal resistance can be lowered to a negligible level to have a smaller thermal resistance than silicone rubber heat-radiation sheets having equal thermal conductivity.

What is claimed is:

1. A heat-softening heat-radiation sheet comprising a polyolefin-based heat-conductive composition which comprises an ethylene/α-olefin/non-conjugated polyene random copolymer and a heat-conductive filler, wherein the composition has a softening point of 40° C. or above, a thermal conductivity of 1.0 W/mK or higher, a viscosity at 80° C. of from $1 \times 10^2$ to $1 \times 10^5$ Pa·s and a plasticity at 25° C. in the range of from 100 to 700.

2. The heat-softening heat-radiation sheet according to claim 1, further comprising an α-olefin polymer having a softening point of from 40° C. to 120° C.

3. The heat-softening heat-radiation sheet according to claim 2, further comprising, an ethylene/α-olefin copolymer.

4. The heat-softening heat-radiation sheet according to claim 1, further comprising a polyolefin comprising polymerized units of an α-olefin represented by formula (1):

$$CH_2=CH(CH_2)_nCH_3 \tag{1}$$

wherein n is an integer of 16 to 50.

5. The heat-softening heat-radiation sheet according to claim 1, further comprising an ethylene/α-olefin copolymer represented by formula (2):

$$[(CH_2-CH_2)_x-(CH_2-CRH)_Y]_P \tag{2}$$

wherein R is an alkyl group represented by $-C_nH_{2n+1}$ where n is an positive integer; and X, Y, and P are positive integers;

and having a viscosity at 25° C. in the range of from 200 cSt to 1,000,000 cSt.

6. The heat-softening heat-radiation sheet according to claim 1, wherein said ethylene/α-olefin/non-conjugated polyene random copolymer has a Mooney viscosity (JIS K 6395) at 100° C. in the range of from 5 to 50.

7. The heat-softening heat-radiation sheet according to claim 2, wherein said α-olefin polymer is derived from two or more α-olefins having a different number of carbon atoms.

8. The heat-softening heat-radiation sheet according to claim 3, wherein said ethylene/α-olefin copolymer is a mixture of two or more ethylene/α-olefin copolymers having different viscosities at 25° C.

9. The heat-softening heat-radiation sheet according to claim 1, wherein said ethylene/α-olefin/non-conjugated polyene random copolymer is a mixture of two or more ethylene/α-olefin/non-conjugated polyene random copolymers having different ethylene contents.

10. The heat-softening heat-radiation sheet according to claim 1, wherein said heat-conductive filler is at least one selected from the group consisting of a metal, an inorganic oxide and an inorganic nitride.

11. The heat-softening heat-radiation sheet according to claim 1, wherein the ethylene/α-olefin/non-conjugated polyene random copolymer comprises at least one vinyl group-terminated norbornene compound of formula (3)

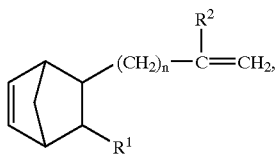
(3)

wherein n is an integer of 0–10, $R^1$ is a hydrogen atom or an alkyl group having 1–10 carbon atoms, and $R^2$ is a hydrogen atom or an alkyl group having 1–5 carbon atoms.

12. The heat-softening heat-radiation sheet according to claim 1, wherein the ethylene/α-olefin/non-conjugated polyene random copolymer comprises at least one vinyl group-terminated norbornene compound represented by formula (4)

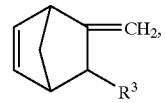
(4)

wherein $R^3$ is a hydrogen atom or an alkyl group having 1–10 carbon atoms.

13. The heat-softening heat-radiation sheet according to claim 1, wherein the ethylene/α-olefin non-conjugated polyene random copolymer comprises copolymerized units of at least one selected from the group consisting of 5-vinyl-norbornene and 5-methylene-norbornene.

14. The heat-softening heat-radiation sheet according to claim 1, wherein the heat-conductive filler is present in an amount of from 66–89% by weight.

15. The heat-softening heat-radiation sheet according to claim 1, wherein the ethylene/α-olefin/non-conjugated polyene random copolymer has an ethylene content of 63% or greater.

16. The heat-softening heat-radiation sheet according to claim 1, wherein the heat-conductive filler is at least one selected from the group consisting of iron, aluminum, nickel, silver and gold.

17. The heat-softening heat-radiation sheet according to claim 1, wherein the heat-conductive filler is at least one selected from the group consisting of silicon oxide, aluminum oxide, zinc oxide, iron oxide and magnesium oxide.

18. The heat-softening heat-radiation sheet according to claim 1, wherein the heat-conductive filler is at least one selected from the group consisting of aluminum nitride and boron nitride.

19. The heat-softening heat-radiation sheet according to claim 1, further comprising an organohydrogenpolysiloxane and a catalyst, or an organic peroxide.

20. The heat-softening heat-radiation sheet according to claim 1, wherein the ethylene/α-olefin/non-conjugated polyene random copolymer is cross-linked.

* * * * *